(12) United States Patent
Powers

(10) Patent No.: US 8,922,873 B2
(45) Date of Patent: Dec. 30, 2014

(54) COMPACT NARROW BANDWIDTH TUNABLE SOURCE

(75) Inventor: Peter Elliott Powers, Dayton, OH (US)

(73) Assignee: University of Dayton, Dayton, OH (US)

(*) Notice: Subject to any disclaimer, the term of this patent is extended or adjusted under 35 U.S.C. 154(b) by 233 days.

(21) Appl. No.: 13/371,815

(22) Filed: Feb. 13, 2012

(65) Prior Publication Data

US 2012/0206792 A1    Aug. 16, 2012

Related U.S. Application Data

(60) Provisional application No. 61/441,698, filed on Feb. 11, 2011.

(51) Int. Cl.
*G02F 1/39* (2006.01)
*G02F 1/35* (2006.01)

(52) U.S. Cl.
CPC *G02F 1/39* (2013.01); *G02F 1/353* (2013.01); *G02F 2201/17* (2013.01)
USPC .......................................................... 359/330

(58) Field of Classification Search
CPC ....... G02F 1/39; G02F 1/353; G02F 2001/39; G02F 2001/392; G02F 2201/17
USPC ................................. 359/326–332; 372/21–22
See application file for complete search history.

(56) References Cited

U.S. PATENT DOCUMENTS

| | | | | |
|---|---|---|---|---|
| 4,944,592 A | * | 7/1990 | Kimble et al. | 356/364 |
| 5,390,211 A | * | 2/1995 | Clark et al. | 372/95 |
| 5,579,152 A | * | 11/1996 | Ellingson et al. | 359/330 |
| 5,781,571 A | * | 7/1998 | Nabors et al. | 372/21 |
| 6,359,914 B1 | | 3/2002 | Powers et al. | |
| 6,744,554 B2 | * | 6/2004 | Shichijyo et al. | 359/326 |
| 7,339,722 B2 | * | 3/2008 | Kelley | 359/330 |
| 2005/0243876 A1 | * | 11/2005 | Kung | 372/21 |

* cited by examiner

*Primary Examiner* — Daniel Petkovsek
(74) *Attorney, Agent, or Firm* — Thompson Hine L.L.P.

(57) ABSTRACT

Tunable light sources having a single optical parametric generation (OPG) source that results in an amplified, narrow bandwidth seed beam and methods of tuning therewith are disclosed. The tunable light source may include a polarization rotator to rotate a pump beam before a first pass through an OPG, and a linear-to-circular polarization device to polarize the pump beam directed back toward the OPG for a second pass therethrough. Alternately, the tunable light source may include an OPG source through which a pump beam passes only in the first direction, a separator that separates a signal beam from the pump beam exiting from the OPG, a narrowband wavelength filter that receives the signal beam and generate a seed beam, and a reflecting surface that directs the seed beam back through the OPG (opposite the first direction) to seed the back part of the pulse of the pulse laser.

12 Claims, 4 Drawing Sheets

COMPACT NARROW BANDWIDTH TUNABLE SOURCE

RELATED APPLICATIONS

This application claims the benefit of U.S. Provisional Application No. 61/441,698 filed Feb. 11, 2011.

TECHNICAL FIELD

This application relates to compact narrow bandwidth tunable sources, more particularly, to those based on optical parametric generation ("OPG") and optical parametric amplification ("OPA").

BACKGROUND

The OPG process is described by the energy conservation statement $\hbar\omega_P = \hbar\omega_S + \hbar\omega_I$ where $\omega_P$ corresponds to the energy of a pump photon, which splits into two photons called the signal and idler with frequencies $\omega_S$ and $\omega_I$ respectively. The conversion efficiency from the pump to signal and idler depends on the nonlinearity of the frequency conversion crystal and to the intensity of the pump beam. Typically the OPG process is very weak, especially for continuous-wave (cw) situations. In these cases a resonator may be placed around the crystal to resonate the signal and in some cases the idler as well. Such a set up is called an optical parametric oscillator (OPO). For Q-switched lasers having pulse durations on the order of 10 nsec or less, the peak intensity is high enough to achieve high conversion efficiency on a single pass of the pump through the nonlinear crystal. When the OPG efficiency is high, it is preferable to the OPO because of the reduced number of optical elements and perhaps more importantly because of the reduced operational complexity. Since the OPG process is single pass, the dynamics of an external OPO cavity are eliminated. Notably, tuning an OPG in a seamless fashion is simpler than an OPO because the OPG is free to oscillate at any frequency whereas the OPO is restricted to specific frequencies defined by the optical cavity modes. An OPG may exhibit similar behavior to an OPO if its end-faces reflect or scatter the signal or idler, which results in a low-finesse, albeit unintentional cavity.

The free-running OPG output bandwidth is typically too large for many applications. Narrowing the linewidth has been accomplished by injection seeding with a filtered OPG (as disclosed in U.S. Pat. No. 6,359,914) or injection seeding with a diode laser. Both techniques work, but the filtered OPG has a subtle advantage. In most cases it is not possible to coat the end facets of the crystal with perfect anti-reflection coatings for the pump, signal and idler. Some residual reflection or scattering leads to a low-finesses cavity. When injection seeding with a diode laser, unless the diode laser matches the residual cavity mode, that seeding is ineffective. This is typically an issue when the pump duration is about 10 nsec where the pump bandwidth is narrower than the free-spectral range (FSR) of the low-finesse cavity. The filtered seed approach alleviates this issue because the filter function is not as sharp as a narrow-linewidth diode laser. The bandwidth of the filtered seed then overlaps one of the cavity modes and seeding is effective.

In cases where the pump duration is about 1 nsec, the pulse has a correspondingly larger bandwidth that (even transform limited) becomes larger than the low-finesses FSR. The signal and idler have similar bandwidths. Since the seed is gated by the pump pulse, the seeding bandwidth is also increased. Seeding in this regime is guaranteed to overlap with at least one of the cavity modes. In this regime a diode laser and filtered signal both are effective seed sources.

The filtered signal approach has a further advantage, it is possible to generate signal over the entire bandwidth of the nonlinear crystal. This is especially important for new classes of nonlinear crystals operating in regions where diode lasers are not available. An example is orientation-patterned gallium arsenide, which operates in the mid-wave infrared region. Although diode lasers are available in the telecommunications region, out to about 1.6 µm, beyond 2 µm direct laser sources are typically expensive or don't exist.

U.S. Pat. No. 6,359,914, which is incorporated by reference herein in its entirety, is based on the filtered signal approach, but requires two nonlinear crystals to operate in most of the embodiments. The two-crystal requirement increases the cost of the system and its complexity. For example, broad tuning of the device requires that both crystals be tuned simultaneously. This may be accomplished by simultaneously temperature tuning both crystals. In the case of quasi-phase matched crystals such as periodically poled lithium niobate (PPLN), tuning may also be accomplished by simultaneously changing the grating periodicity by translating the crystal. As illustrated in FIG. 1, a narrow bandwidth seed is generated by filtering the output of a first stage optical parametric generator. The seed downstream of the filter is amplified in a second stage optical parametric amplifier.

In a separate embodiment of U.S. Pat. No. 6,359,914, a single crystal design is employed. In this embodiment, the pump is split into two beams, one for passing through the crystal in the forward direction to generate a signal and a second pump for amplifying the filtered seed in the backwards direction. This method of using a single crystal by splitting the pump into two beams is different from the current application, which sends the entire pump through the crystal on each pass, and in one embodiment controls how much of the pump is used by controlling the polarization, and in another embodiment using the front edge of the pulse to seed subsequent portions of the pulse. Furthermore, the previous patent required that the narrow bandwidth seed be generated by double-passing the signal through a filter, whereas in the current application we use an approach that utilizes a single-pass (reflection) from the filter. These innovations are distinct from the previous patent and offer a means of generating narrow bandwidth tunable light using fewer optical components and a simpler overall design.

Disclosed herein is a tuning scheme that operates with a single crystal that has many other advantages over the tunable light sources in the prior art.

SUMMARY

In one aspect, tunable light sources are disclosed that include a single optical parametric generation source. The tunable light source may include a polarization rotator to rotate a pump beam before a first pass through an optical parametric generation ("OPG") source, and a linear-to-circular polarization device to polarize the pump beam directed back toward the OPG source for a second pass therethrough. This tunable light source also includes a separator that separates a signal beam from the pump beam that exiting from the OPG source, a narrowband wavelength filter that receives the signal beam and generate a seed beam, and a reflecting surface that directs the seed beam back through the OPG (opposite the first direction) such that the seed beam and the rotated, polarized pump beam pass through the OPG source together in the second direction to produce an amplified narrow bandwidth output. Along with the amplified narrow bandwidth signal is a narrow bandwidth idler. Either or both of these beams may be used as a useful output.

In another embodiment, the tunable light source may include an OPG source through which a pump beam passes only in the first direction, a separator that separates a signal beam from the pump beam exiting from the OPG, a narrowband wavelength filter that receives the signal beam and generate a seed beam, and a reflecting surface that directs the seed beam through the OPG in the same direction as and with the incident pump beam. Passing the seed beam through the OPG with the pump beam in the first direction (the forward direction) seeds later portions of the pump laser.

In another aspect, methods of tuning a light source with these apparatuses are disclosed. In one embodiment, the methods include providing an incident pump beam, and passing the incident pump beam through an optical parametric generation source co-linearly with a seed beam in the same direction as the incident pump beam to produce a narrow bandwidth output.

In another embodiment, the methods include providing a rotated, polarized pump beam, and passing the rotated, polarized pump beam through an optical parametric generation source co-linearly with a seed beam in the same direction to amplify the seed beam and produce a narrow bandwidth output.

DETAILED DESCRIPTION

Figure 1:
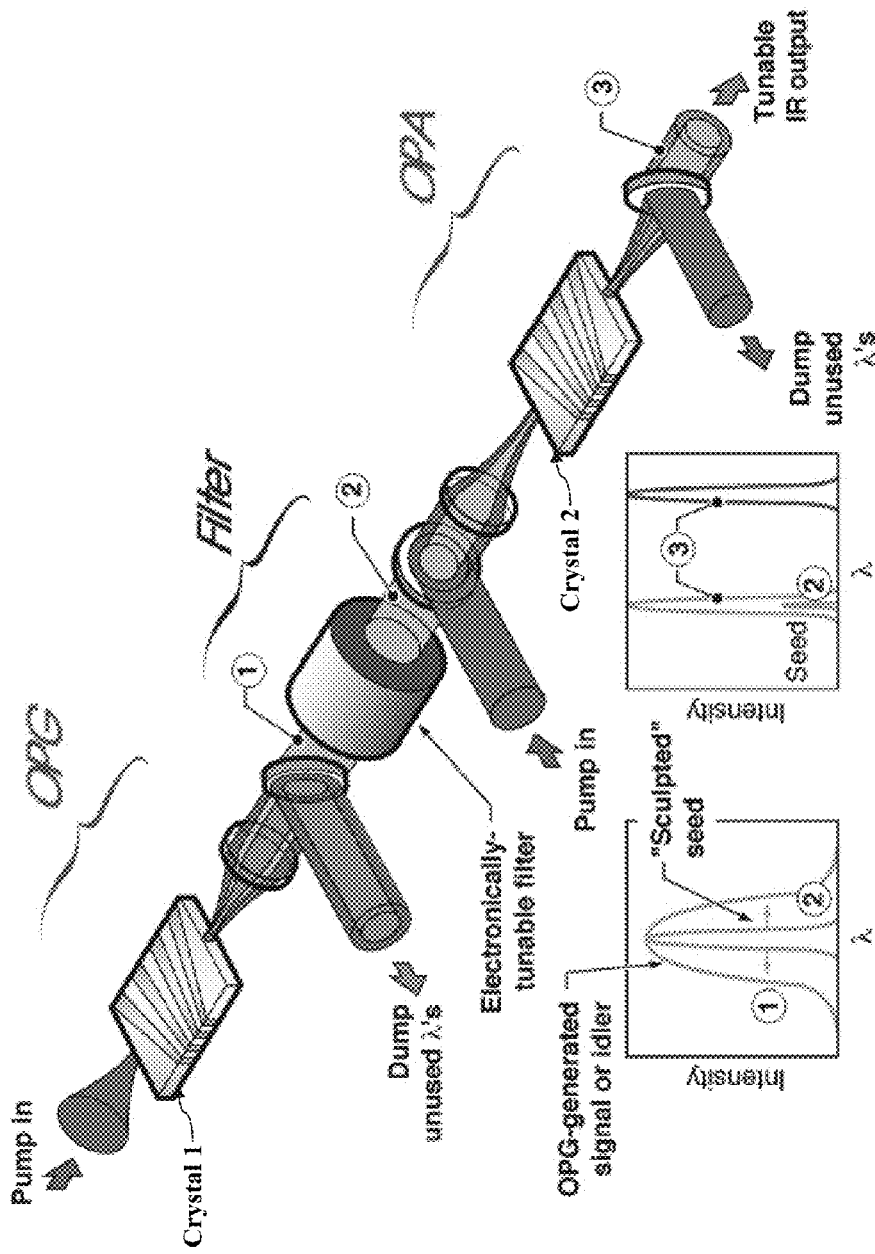
FIG. 1 is a schematic illustration of one embodiment of the tuning scheme disclosed in U.S. Pat. No. 6,359,914.
Figure 2:
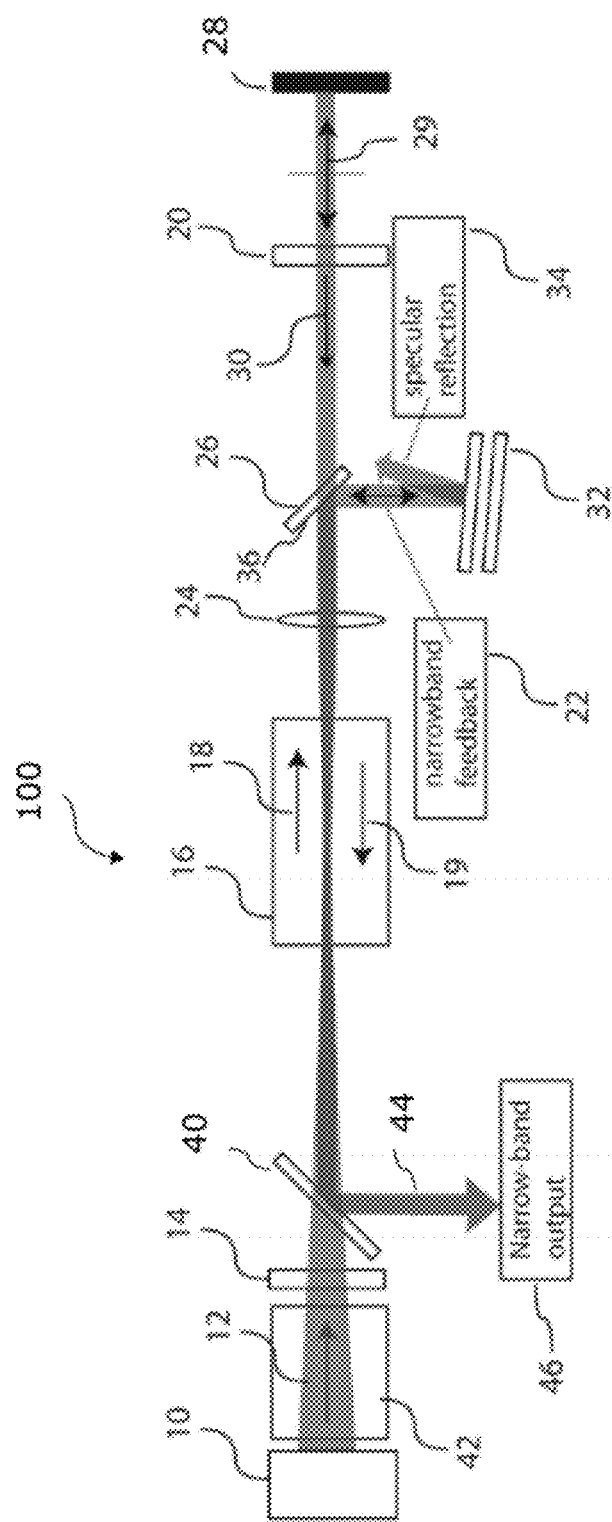
FIG. 2 is a schematic illustration of one embodiment of a tunable light source having a single optical parametric generation source.
Figure 3:
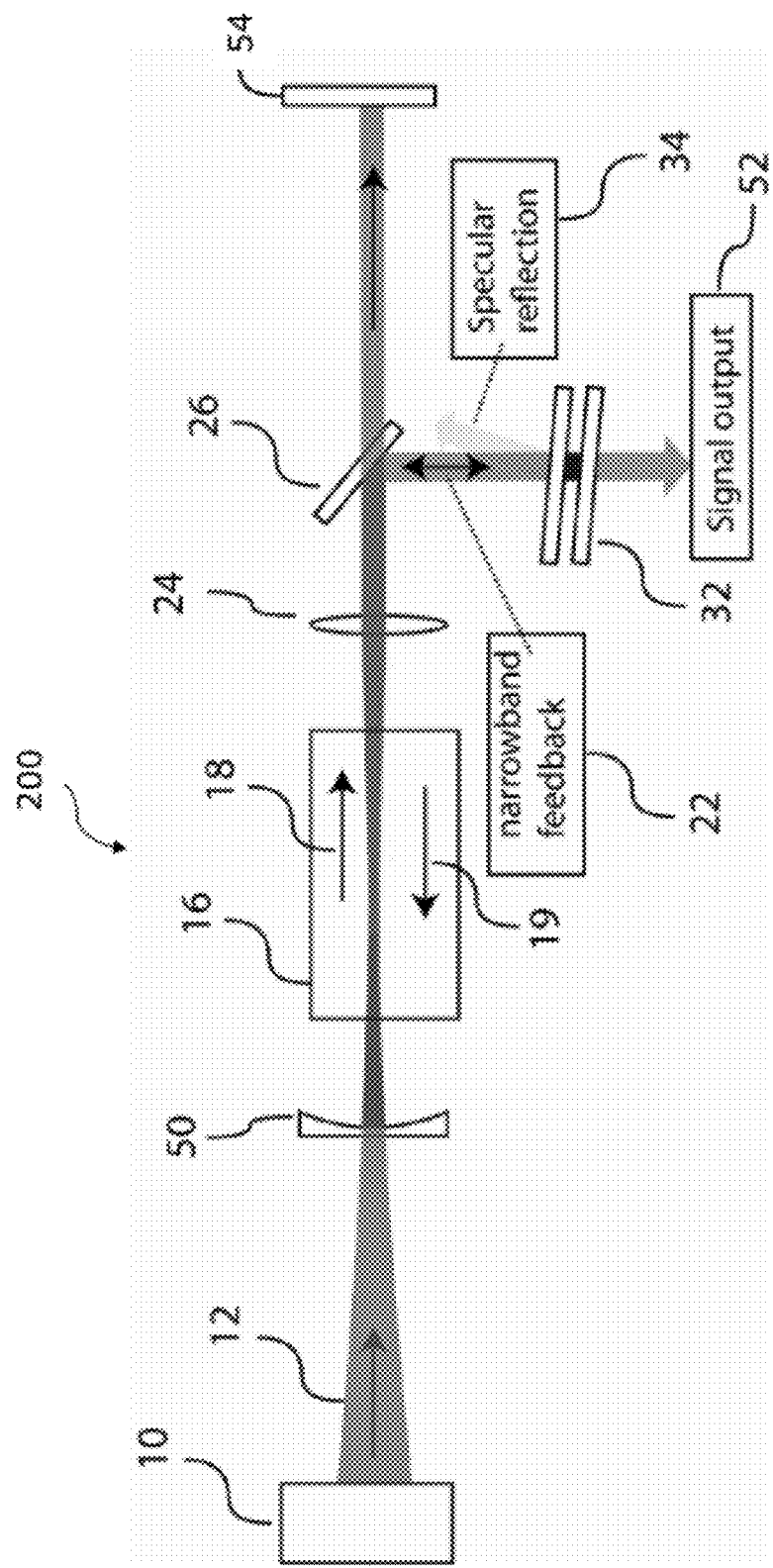
FIG. 3 is schematic illustration of another embodiment of a tunable light source having a single optical parametric generation source.

The following detailed description will illustrate the general principles of the invention, examples of which are additionally illustrated in the accompanying drawings. Tunable light sources having a single optical parametric generation source are disclosed herein. The tunable light source illustrated in FIG. 2 is generally designated 100 and the tunable light source illustrated in FIG. 3 is generally designated 200. In FIGS. 1 and 2, like reference numbers indicate identical or functionally similar elements.

Referring to FIG. 2, the tunable light source 100, in this embodiment, includes a pump laser 10 that generates a pulsed pump beam 12, a first polarization rotator 14 to rotate the pump beam 12 before a first pass through an optical parametric generation source 16 in a first direction 18, and a linear-to-circular polarization device 20 to polarize the pump beam 12 directed back toward the optical parametric generation source 16 for a second pass therethrough in a second direction 19 opposite the first direction. The presence of the first polarization rotator 14 and the linear-to circular polarization device 20 provides a tunable light source 100 in which a larger portion of the pump beam is frequency converted on the second pass through the optical parametric generation source 16 compared to its first pass therethrough. Accordingly, the majority of the frequency conversion is generated on the second pass the optical parametric generation source 16.

The pump laser 10 is arranged to generate a pulsed pump beam 12 characterised by a periodic pulse repetition. The periodic pulse repetition may vary from one type of laser source to another. In one embodiment, the laser may be or include a Nd:YAG laser operating at a repetition rate of 1 kHz and a wavelength of 1.064 µm and must have sufficient energy to drive the nonlinear process in the optical parametric generation source 16 of the present invention, as described in detail below. In one embodiment, the laser may have nanosecond, picoseconds, or femtoseconds pulse duration. In one embodiment, the pulse duration is between about 1 ns and 20 ns. In another embodiment, the laser may operate anywhere from the ultraviolet to infrared spectral region.

The first polarization rotator 14 rotates the pump beam and may be a half-wave plate, or equivalently, may be a set of external optics that accomplish the rotation of the beam. Although all of the pump energy passes through the optical parametric generation source 16, which may be a crystal such as a non-linear optical crystal, it's polarization is rotated such that only a portion is in the direction dictated by phase (or quasi-phase) matching. For example, the pump beam polarization may be thought of as consisting of two components, vertical and horizontal. If the crystal will phase match the vertical component of the pump beam, then the horizontal component is unaffected. By rotating the pump beam we are able to control the amount of the pump beam that will phase match in that crystal. Experiments have shown that rotating the pump beam 90° with respect to the proper orientation still generates a sufficient amount of seed energy. The reason this rotation works is that the pump beam's purity is never perfect, so even rotated 90°, there is still a component of the pump beam that is in the direction for phase matching. This component for our system is estimated to be approximately 1 part in 100.

Using the setup in FIG. 2, the seed beam 22 is generated by using a small portion of the pump beam's energy in a first pass through the optical parametric generation source 16. After the first pass through the optical parametric generation source 16, a relatively broad bandwidth signal and idler beam are generated. Optionally, a lens 24 collimates the signal, pump, and idler beams before separating the pump and signal beams with a separator 26. The separator 26 may be, but is not limited to, a dichroic mirror.

The pump beam, after separation from the signal beam, is then directed to a linear-to-circular polarization device 20, which may be, but is not limited to, a quarter-wave plate or a Fresnel rhomb, which transforms the linearly polarized pump into a circularly polarized beam 29. The linear-to-circular polarization device 20 is positioned in the path of the pump beam 12 between the optical parametric generation source 16 and a reflector 28 such that the pump beam 12 passes through the linear-to-circular polarization device 20 twice, once in the first direction 18 and once in the second direction 19. Assuming the beam is right-circularly polarized at this point 29. The pump beam is retro-reflected by a reflector 28 (such as, but not limited to, a mirror) and the right-circularly polarized beam becomes left-circularly polarized. After passing through the linear-to-circular polarization device 20 for the second time, the returning pump beam 30 becomes linearly polarized, but rotated 90° to the incoming pump beam. Therefore, when the pump beam passes back through the crystal it is rotated such that the majority of the beam polarization is now correct for phase matching.

The relatively broad bandwidth signal after separation from the pump beam is directed to a narrowband wavelength filter 32 capable of generating a seed beam. In one embodiment, the narrowband wavelength filter 32 is or includes an etalon. FIG. 2 shows a configuration where the signal beam is fed back from the etalon itself, but we also note that a double-pass through the etalon by retro-reflecting the transmitted etalon beam is also possible. In our experiments, the setup shown in FIG. 2 worked as well as double-passing through the etalon, and in fact was much simpler to align. The mechanism for feedback from the etalon configuration shown in FIG. 2 is believed to be due to scattering from the etalon. The etalon typically reflects incident light unless it is at one of several roughly evenly spaced frequencies, separated by the free spectral range of the etalon. When the incident beam does not have spectral content that overlaps with one or more of the etalon modes, then nearly all the light is reflected. Similarly, any scattering that occurs has no spectral discriminator, that is all the incident frequencies are scattered equally. In contrast, when there is an overlap of the incident beam's spectrum and one of the etalon modes, then that frequency is transmitted. Moreover, the field inside the etalon is enhanced at that frequency, thus enhancing any scattering for that particular frequency. A portion of this scattered beam is in the direction of the incident beam and leads to seeding for the pump beam as it passes back through the crystal.

The scattered beam is sufficient for seeding because the seeding process itself requires little power. For example, when seeding an OPG with a diode laser, the amount of seed energy when the pump pulse is present is very low. Consider, for example, a scenario typical for seeding a PPLN OPG when using a about 1 nsec pump pulse. Successful seeding occurs when using a diode laser operating with 100 µW and less. The energy of the seed when the pump is present in the crystals is approximately $(100 \times 10^{-6}\ J/s) \times (1 \times 10^{-9}\ s) = 1 \times 10^{-13}$ J. Experimentally, seeding a PPLN OPG was successful using an attenuated diode laser with a seed power less than 100 µW. So less than 100 femtoJoules of pulse energy is required to seed.

By orienting the narrowband wavelength filter 32 at a slight angle, the broad bandwidth specular reflection 34 is dumped and a narrow bandwidth filtered output 22 (the seed beam) is automatically retro-reflected along the input beam path in the second direction 19 to pass through the optical parametric generation source 16 in the second direction 19. The seed beam 22 is retro-reflected by either a second reflector (not shown) or a reflective surface 36 of the separator 26. The specific frequency of the reflected seed beam 22 depends on the characteristics of the narrowband wavelength filter 32. In the embodiment where the narrowband wavelength filter 32 is an etalon, mirror spacing and the rotation of the etalon affect the specific frequency of the seed beam 22. Tuning is accomplished by, but not limited to, either mirror spacing or the rotation of the etalon can be used to tune the retro-reflected beam's frequency. Placing the etalon at normal incidence feeds back a large bandwidth, with narrow lines filtered out.

Both the retro-reflected filtered seed 22 and rotated polarization pump beam 30 are recombined at the separator 26, which in one embodiment is a dichroic mirror, and are sent back through the optical parametric generation source 16. On this the second pass, the majority of the original pump beam has a proper polarization for phase matching and is co-aligned with the filtered seed. As a result, the filtered seed beam 22 is amplified resulting in a high energy output beam at the seed frequency (signal) along with another narrow bandwidth output at the difference frequency (idler) between the pump and signal (dictated by energy conservation). The signal beam and idler 44 are separated from the pump beam using a second separator 40. The signal beam and idler 44 are the result of the tuning of the light source to provide a narrowband output 46. The second separator 40 may be a dichroic mirror, but is not limited thereto.

As illustrated in FIG. 2, to prevent damage or instabilities to the pump laser 10, an optical isolator 42 may be used to prevent pump feedback. However, some lasers are insensitive to such feedback and the isolator 42 may not be necessary. The first polarization rotator 14 may be positioned before the second separator 40, for example between the optical isolator 42 and the second separator 40, or after the second separator 40 but before the OPG source 16.

The approach described here and shown in FIG. 2 has numerous advantages. First, it uses a single optical parametric generation source 16, which is cheaper than using two. The single optical parametric generation source 16 also ensures that the first and second stages (generating the seed and then amplifying it) are automatically matched to each other. Moreover, the entire phase matching region of the crystal is accessible, limited only by the narrowband wavelength filter's 32 reflectivity range. Broader bandwidths are possible by using broadly tunable narrowband wavelength filters or by swapping in narrowband wavelength filters for different spectral regions, which we note is much cheaper than swapping tunable diode lasers. Second, the method of rotating the pump polarization such that a small amount of the pump beam is used on the first pass and the majority is used on the second pass is unique. Third, the method of filtering the first-stage OPG using the reflected (scattered) portion of the etalon automatically aligns the seed beam, eliminating what would otherwise be a critically aligned element.

The tunable light source 100 shown in FIG. 2 may be used to generate a narrow bandwidth output 46. The method to generate the narrow bandwidth output 46 includes the step of providing a rotated, polarized pump beam 30 and passing the rotated, polarized pump beam 30 through an optical parametric generation source 16 co-linearly with a seed beam 22 in the same direction to amplify the seed beam and produce a narrow bandwidth output. This approach uses a first stage optical parametric generator, which is subsequently filtered generating a narrow bandwidth seed. The seed is then amplified in an optical parametric amplifier. Because the seed is generated by filtering the output of the optical parametric generator, seeding is possible over the entire tuning range of the optical parametric generation source.

The method may also include the steps of rotating the pump beam to reduce the amount of the pump beam that is phase matched to the optical parametric generation source before directing the pump beam through the optical parametric generation source in a first direction; directing the pump beam 12 through the optical parametric generation source to generate a signal beam, separating the pump beam and signal beam that exit the optical parametric generation source, and then polarizing the pump beam, filtering the signal beam to produce the seed beam; and redirecting the seed beam and the rotated, polarized pump beam so that they together pass through the optical parametric generation source in a second direction opposite the first direction to amplify the seed beam and produce a narrow bandwidth output.

In one embodiment, the rotated, polarized pump beam is phase matched to the optical parametric generation source and is co-aligned with the seed beam as they pass through the optical parametric generation source together. The method may also include the step of separating the pump beam from the narrow bandwidth output produced by the passage of the rotated, polarized pump beam and the seed beam through the optical parametric generation source.

In another embodiment, the method may also include the steps of separating the pump beam and the signal beam after exiting the optical parametric generation source before polarizing the pump beam and filtering the signal beam, and optionally the step of colliminating the pump beam and signal beam exiting the optical parametric generation source before separating them.

In another embodiment, the narrow bandwidth is generated with only one pass of the pump beam 12 through a single optical parametric generation source 16 as illustrated in FIG. 3. Here, the front part of a pulse from the pump laser 10 generates a seed beam 22 that subsequently seeds the back part of the same pulse.

Using the same idea that very little energy is needed for seeding, the approach shown in FIG. 3 allows the front edge of the pulse, which contains low energy to generate a broad bandwidth signal that can be filtered to generate a narrow bandwidth seed 22. Similarly to FIG. 2, the pump beam 12 in FIG. 3 exits the optical parametric generation source 16 (in a first direction 18) and is separated into a pump beam and a signal beam by a separator 26, which directs the signal beam to the narrowband wavelength filter 32. This signal beam is filtered using the narrowband wavelength filter 32 in the same way as in FIG. 2 described above. The narrow bandwidth reflected/scattered seed beam 22 is then directed back through the optical parametric generation source 16 (in the second direction 19) where it is retroreflected by a reflector 50, which may be, but is not limited to a dichroic mirror. Hence, the filtered seed 22 is now collinear with the incident pump beam 12 and both are passing through the optical parametric generation source 16 in the first direction 18. As a result, the seed beam 22 (created from the front part of a pulse) seeds the back part of the same pulse of the pulse laser. This amplifies the frequency of the narrowband signal output 52. Since the seed frequency corresponds to a narrowband wavelength filter 32 transmission, most of the signal output 52 is transmitted through the narrowband wavelength filter 32, which provides access to the signal output 52 itself.

The light tuning source 200 may also include a second separator 54 positioned downstream of the first separator 26 to separate the pump from the idler from one another. The second separator may be, but is not limited to, a dichroic mirror. This embodiment further reduces the number of optical elements even more so than FIG. 2, thus is more cost effective and notably eliminates the need for an optical isolator to protect the pump laser.

Any other components of FIG. 3 that are numbered the same as in FIG. 2 operate similarly and are as described above.

The tunable light source 200 shown in FIG. 3 may be used to generate a narrow bandwidth output 52. The method to generate the narrow bandwidth output 52 includes the step of providing an incident pump beam 12, and passing the incident pump beam 12 through an optical parametric generation source 16 co-linearly with a seed beam 22 in the same direction to amplify the seed beam and produce a narrow bandwidth output 52. When the incident pump beam passes through the optical parametric generation source a signal beam is generated. The method may include the steps of separating the pump beam 12 and signal beam exiting the optical parametric generation source 16, filtering the signal beam to produce the seed beam 22, redirecting the seed beam 22 through the optical parametric generation source 16 in a direction opposite the incident pump beam 12, and retroreflecting the seed beam 22 for the passing of the seed beam with the incident pump beam 12 through the optical parametric generation source 16. This method generates the seed beam from a front part of a pulse defining the pump beam, which seeds the back part of the pulse when the retroreflected seed beam passes through the optical parametric generation source 16 with the incident pump beam 12.

Figure 4:
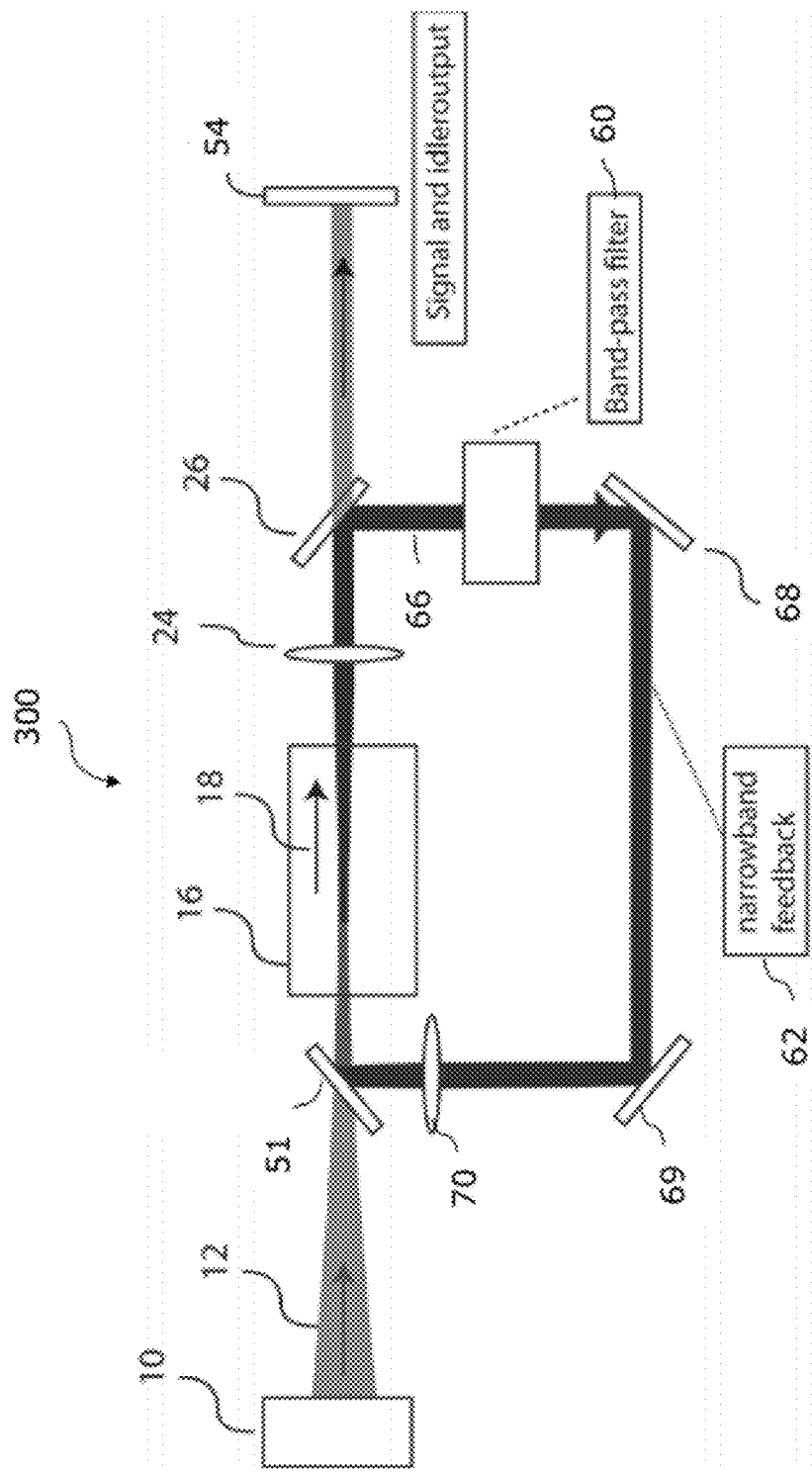
FIG. 4 is a schematic illustration of another embodiment of a tunable light source having a single optical parametric generation source.

While the schematic illustrated in FIG. 3 has the seed beam pass back through the OPG source 16, this is not a requirement. As illustrated in FIG. 4, an alternate schematic directs the seed beam 62 to the incident side of the OPG source 16 without passing through the source 16. This alternate embodiment of a tunable light source is generally designated 300. As shown in FIG. 4, the seed 62 is redirected external to the OPG source 16 and then optical element 51 recombines the seed 62 with the pump pulse 12 in the first direction 18. Optical element 51 may be a reflector such as a dichroic mirror, but is not limited thereto. In this embodiment, a portion of the signal output 66 is directed to the narrow band-pass filter 60 using separator 26. For this embodiment, reflector 26 only reflects a portion of the signal. In this way, most of the signal is transmitted through 26 while the small portion that is reflected, reflected signal output 66, is used for seeding. Element 26 also should transmit the idler. Accordingly, it is preferred that the main signal output is transmitted through element 26 along with the idler. Once the seed 62 is generated it is directed by optical elements 68, 69, and 51, in that order in FIG. 4, to the incident side of the OPG source. Within the pathway created by optical elements 68 and 69, a collimator 70 may also be included to focus the seed onto optical element 51. The optical elements 68 and 69 may be mirrors, dichroic mirrors, and other reflecting surfaces, prisms, or combinations thereof. The collimator 70 may be a lens, prism, or combinations thereof.

In another embodiment, the signal output 66 may be directed elsewhere in the feedback loop. For example, by making separator 26 highly reflective at the signal wavelength and then making optical element 68 transmit most of the signal and reflect a small portion for seed.

Each of the tunable light sources disclosed herein, because of the broad tuning and narrow linewidth, are attractive for, but not limited to, spectroscopy, infrared counter-measures, laser radar, and remote sensing. Additionally, the embodiments greatly reduce the number of optical elements required, thus reducing the cost and the overall complexity of the device.

Having described the invention in detail and by reference to preferred embodiments thereof, it will be apparent that modifications and variations are possible without departing from the scope of the invention which is defined in the appended claims.

What is claimed is:

1. A tunable light source comprising:
a first polarization rotator to rotate a pump beam before a first pass through an optical parametric generation source in a first direction;
a first separator to separate the pump beam exiting the optical parametric generation source from a signal beam also exiting the optical parametric generation source;
a narrowband wavelength filter positioned to receive the signal beam from the first separator and generate a seed beam;
a linear-to-circular polarization device to polarize the pump beam directed back toward the optical parametric generation source, after reflecting off a first reflector, for a second pass therethrough in a second direction opposite the first direction;
a second reflector or a reflective surface of the first reflector positioned to direct the seed beam along the pump beam path in the second direction to pass through the optical parametric generation source in the second direction along with the pump beam; and a second separator positioned to separate the seed beam from an idler beam after exiting the optical parametric generation source in the second direction;

wherein a larger portion of the pump beam is frequency converted on the second pass through the optical parametric generation source compared to the first pass.

2. The tunable light source of claim 1, wherein the first polarization rotator is or includes a half-wave plate or an optical setup and the linear-to-circular polarization device is or includes a quarter-wave plate or a Fresnel rhomb.

3. The tunable light source of claim 1, wherein the linear-to-circular polarization device is positioned in the path of the pump beam between the optical parametric generation source and a first reflector such that the pump beam passes through the linear-to-circular polarization device twice, once in the first direction and once in the second direction.

4. The tunable light source of claim 1, wherein the narrowband wavelength filter is or includes an etalon or a double-pass through etalon.

5. A method of tuning a light source, the method comprising:
    providing the tunable light source of claim 1;
    providing an incident pump beam;
    passing the incident pump beam through the optical parametric generation source in the first direction to generate the signal beam;
    separating the pump beam and the signal beam exiting the optical parametric generation source in the first direction using the first separator;
    passing the pump beam, after separating using the separator, through the linear-to-circular polarization device in the first direction, reflecting the pump beam off of a first reflector and back through the linear-to-polarization device in the second direction;
    filtering the signal beam using the narrowband wavelength filter to generate the seed beam; and
    redirecting the seed beam to pass through the optical parametric generation source in the second direction along with the pump beam after the pump beam has passed through the linear-to-circular polarization device in the first and second directions.

6. A method of tuning a light source, the method comprising:
    providing a tunable light source of claim 1;
    generating a rotated, polarized pump beam after passing the pump beam through the optical parametric generation source in a first direction and through a linear-to-circular polarization device in both the first direction and the second direction;
    generating a seed beam from the pump beam exiting the optical parametric generation source by separating a signal beam from the pump beam and filtering it to the seed beam using the narrowband wavelength filter;
    passing the rotated, polarized pump beam through the optical parametric generation source in the second direction co-linearly with the seed beam to amplify the seed beam and produce a narrow bandwidth output.

7. The method of claim 6, wherein the polarized pump beam is phase matched to the optical parametric generation source and is co-aligned with the seed beam.

8. The method of claim 6, further comprising:
    separating, using the second separator, the idler beam from the pump beam.

9. The method of claim 6 further comprising:
    wherein the tunable light source further comprises a lens positioned between the first separator and the optical parametric generation source; and
    collimating the pump beam and signal beam exiting the optical parametric generation source, using the lens, before separating them.

10. The tunable light source of claim 1, further comprising a lens positioned between the optical parametric generation source and the first separator, wherein the lens collimates the pump beam and signal beam exiting the optical parametric generation source in the first direction.

11. The tunable light source of claim 1, further comprising an optical isolator positioned before or after the first polarization rotator.

12. The tunable light source of claim 1, wherein the narrowband wavelength filter is positioned at an angle relative to a path of the incoming signal beam so that the seed beam is retro-reflected back along the path of the incoming signal beam.

* * * * *